United States Patent
Bae et al.

(10) Patent No.: US 12,446,078 B2
(45) Date of Patent: *Oct. 14, 2025

(54) PUSCH AND PRACH ENHANCEMENTS

(71) Applicant: Samsung Electronics Co., Ltd., Suwon-si (KR)

(72) Inventors: Jung Hyun Bae, San Diego, CA (US); Mohammed Karmoose, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/649,991

(22) Filed: Apr. 29, 2024

(65) Prior Publication Data

US 2024/0357669 A1  Oct. 24, 2024

Related U.S. Application Data

(63) Continuation of application No. 17/476,415, filed on Sep. 15, 2021, now Pat. No. 11,974,331.

(Continued)

(51) Int. Cl.
*H04W 74/0833* (2024.01)
*H04W 72/0446* (2023.01)
(Continued)

(52) U.S. Cl.
CPC ... *H04W 74/0841* (2013.01); *H04W 72/0446* (2013.01); *H04W 72/1268* (2013.01); *H04W 74/002* (2013.01)

(58) Field of Classification Search
None
See application file for complete search history.

(56) References Cited

U.S. PATENT DOCUMENTS 10,009,931 B2  6/2018  Tabet et al.
10,778,288 B2  9/2020  Tsai
(Continued)

FOREIGN PATENT DOCUMENTS

TW   I707558 B   10/2020

OTHER PUBLICATIONS

EPO Extended European Search Report dated Mar. 1, 2022, issued in corresponding European U.S. Appl. No. 21/197,708. 7 (12 pages).

(Continued)

*Primary Examiner* — Lonnie V Sweet
(74) *Attorney, Agent, or Firm* — Lewis Roca Rothgerber Christie LLP

(57) ABSTRACT

A method for PUSCH repetition or PRACH aggregation. In some embodiments, the method includes transmitting, by a User Equipment (UE), in a first slot, a first Physical Uplink Shared Channel (PUSCH) transmission including a set of coded bits selected from a circular buffer of the UE based on a first redundancy version (RV); determining, by the UE, that a second slot is available for an earliest repetition of the first PUSCH transmission, the second slot being later than the slot immediately following the first slot; determining, by the UE, based on the second slot, a second redundancy version; and transmitting, by the UE, in the second slot, a second PUSCH transmission including a set of coded bits selected from the circular buffer of the UE based on the second redundancy version, the second PUSCH transmission being a repetition of the first PUSCH transmission.

20 Claims, 18 Drawing Sheets

Enhanced RV index determination procedure

Related U.S. Application Data

(60) Provisional application No. 63/182,688, filed on Apr. 30, 2021, provisional application No. 63/164,347, filed on Mar. 22, 2021, provisional application No. 63/161,225, filed on Mar. 15, 2021, provisional application No. 63/092,882, filed on Oct. 16, 2020.

(51) Int. Cl.
*H04W 72/1268* (2023.01)
*H04W 74/00* (2009.01)

(56) References Cited

U.S. PATENT DOCUMENTS

| | | | |
|---|---|---|---|
| 11,974,331 B2* | 4/2024 | Bae | H04W 74/002 |
| 2014/0064207 A1 | 3/2014 | Ramos et al. | |
| 2019/0268947 A1 | 8/2019 | Zhang et al. | |
| 2020/0052827 A1* | 2/2020 | Vilaipornsawai | H04W 72/23 |
| 2020/0052828 A1* | 2/2020 | Wang | H04L 1/188 |
| 2020/0267773 A1* | 8/2020 | Islam | H04W 74/0808 |
| 2020/0336264 A1* | 10/2020 | Faxér | H04B 7/0617 |
| 2021/0007087 A1* | 1/2021 | Wei | H04L 1/18 |
| 2021/0058971 A1 | 2/2021 | Molavianjazi et al. | |
| 2022/0022208 A1 | 1/2022 | Nakamura | |
| 2022/0052832 A1 | 2/2022 | Ersbo | |
| 2022/0053528 A1* | 2/2022 | Li | H04L 5/0044 |
| 2022/0132533 A1* | 4/2022 | Taherzadeh Boroujeni | H04B 7/2656 |
| 2022/0132555 A1* | 4/2022 | Blankenship | H04W 72/23 |
| 2022/0225389 A1* | 7/2022 | Go | H04B 7/0695 |
| 2022/0231789 A1* | 7/2022 | Ying | H04L 1/189 |
| 2022/0312483 A1 | 9/2022 | Bae | |
| 2023/0231690 A1 | 7/2023 | Li | |
| 2023/0291515 A1 | 9/2023 | Dai | |
| 2023/0328723 A1* | 10/2023 | Dai | H04W 72/1268 370/329 |
| 2024/0032024 A1* | 1/2024 | Dai | H04L 1/08 |

OTHER PUBLICATIONS

Ericsson, "PUSCH Enhancements for NR URLLC," 3GPP; R1-1908123 PUSCH Enhancements for NR URLLC, 3rd Generation Partnership Project (3GPP), Mobile Competence Centre; 650, Route Des Lucioles; F-06921 Sophia-Antipolis Cedex; France, vol. RAN WG1, No. Prague, CZ; Aug. 26, 2019-Aug. 30, 2019 Aug. 17, 2019 (Aug. 17, 2019), XP051764740, Retrieved from the Internet: URL: http://www.3gpp.org/ftp/tsg_ran/WG1_RL 1/TSGR 1_98/Docs/R1-1908123.zip [retrieved on Aug. 17, 2019], 16 pages.

Huawei et al., "PUSCH enhancements for URLLC," 3GPP; R1-1910068, 3rd Generation Partnership Project (3GPP), Mobile Competence Centre; 650, Route Des Lucioles; F-06921 Sophia-Antipolis Cedex; France, vol. RAN WG1, No. Chongqing, China; Oct. 14, 2019-Oct. 20, 2019 Oct. 8, 2019 (Oct. 8, 2019), XP051788875, Retrieved from the Internet: URL: http://www.3gpp.org/ftp/tsg_ran/WG1_RL 1/TSGR1_98b/Docs/R1-1910068.zip [retrieved on Oct. 8, 2019], 13 pages.

Huawei et al., "PUSCH enhancements for URLLC," 3GPP; R1-1911892, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 18, 2019-Nov. 22, 2019 Nov. 9, 2019 (Nov. 9, 2019), XP051823074, Retrieved from the Internet: URL: https://ftp.3gpp.org/tsg_ran/WG1_RL 1/TSGR1_99/Docs/R1-1911892.zip R1-1911892.doc [retrieved on Nov. 9, 2019], 9 pages.

EPO Extended European Search Report dated Mar. 1, 2022, issued in corresponding European Patent Application No. 21197708. 7 (12 pages).

CATT: "Remaining issues on multi-TRP/panel transmission," 3GPP, R1-1912176, 3rd Generation Partnership Project (3GPP), Nov. 2019, 21 pages, Retrieved from the Internet: URL: https://www.3gpp.org/ftp/tsg_ran/WG1_RL1/TSGR1_99/Docs.

Taiwanese Office Action dated Dec. 10, 2024, issued in corresponding Taiwanese Patent Application No. 110138139 (10 pages).

* cited by examiner

| $rv_{id}$ indicated by the DCI scheduling the PUSCH | $rv_{id}$ to be applied to $k^{th}$ actual PUSCH transmission (repetition Type A) | | | |
|---|---|---|---|---|
| | $k$ mod 4 = 0 | $k$ mod 4 = 1 | $k$ mod 4 = 2 | $k$ mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

FIG. 5A

Rel-16 RV index determination procedure

Enhanced RV index determination procedure

PUSCH AND PRACH ENHANCEMENTS

CROSS-REFERENCE TO RELATED APPLICATION(S)

This application is a continuation of U.S. patent application Ser. No. 17/476,415, filed on Sep. 15, 2021, which claims priority to and the benefit of (i) U.S. Provisional Application No. 63/161,225, filed Mar. 15, 2021, entitled "ENHANCEMENTS TO PUSCH REPETITIONS", (ii) U.S. Provisional Application No. 63/164,347, filed Mar. 22, 2021, entitled "ENHANCEMENTS TO PUSCH REPETITIONS", (iii) U.S. Provisional Application No. 63/182,688, filed Apr. 30, 2021, entitled "ENHANCEMENTS TO PUSCH REPETITIONS", and (iv) U.S. Provisional Application No. 63/092,882, filed Oct. 16, 2020, entitled "PRACH ENHANCEMENTS FOR COVERAGE ENHANCEMENTS", the entire contents of all of which are incorporated herein by reference.

FIELD

One or more aspects of embodiments according to the present disclosure relate to mobile communications, and more particularly to enhancements to Physical Uplink Shared Channel and Physical Random Access Channel transmissions.

BACKGROUND

In some circumstances in a mobile communications network, Physical Uplink Shared Channel (PUSCH) transmissions may be repeated to improve the likelihood of their being successfully decoded. Similarly Physical Random Access Channel (PRACH) may also be repeated, or aggregated. In such situations it may be advantageous to ensure that the redundancy versions of the PUSCH transmissions are not all the same, and it may be possible to incorporate useful features, such as different beams for use in beam refinement, into aggregated PRACH transmissions.

Thus, there is a need for a system and method for PUSCH and PRACH enhancements.

SUMMARY

According to an embodiment of the present disclosure, there is provided a method, including: transmitting, by a User Equipment (UE), in a first slot, a first Physical Uplink Shared Channel (PUSCH) transmission including a set of coded bits selected from a circular buffer of the UE based on a first redundancy version (RV); determining, by the UE, that a second slot is available for an earliest repetition of the first PUSCH transmission, the second slot being later than the slot immediately following the first slot; determining, by the UE, based on the second slot, a second redundancy version; and transmitting, by the UE, in the second slot, a second PUSCH transmission including a set of coded bits selected from the circular buffer of the UE based on the second redundancy version, the second PUSCH transmission being a repetition of the first PUSCH transmission.

In some embodiments, the second PUSCH transmission is a Type A repetition of the first PUSCH transmission.

In some embodiments, the determining that the second slot is available for an earliest repetition of the first PUSCH transmission includes: receiving a slot format indicator (SFI); and determining that the second slot is a slot identified, by the SFI, as an uplink slot.

In some embodiments, the determining that the second slot is available for an earliest repetition of the first PUSCH transmission includes: missing a slot format indicator having a region of applicability having a beginning and an end and including a plurality of slots; and determining that the second slot occurs later than the end of the region of applicability.

In some embodiments, the method further includes: determining that no slots are available after a last scheduled PUSCH repetition and before an end of a maximum PUSCH transmission duration interval, and not transmitting a PUSCH repetition after the last scheduled PUSCH repetition.

In some embodiments, the method further includes: receiving an indication from a network node (gNB) that a third slot is available for a PUSCH repetition; receiving an indication from the gNB that the third slot is not available for a PUSCH repetition; and determining that the third slot is not available for a PUSCH repetition.

In some embodiments: the transmitting, by the UE, of the first PUSCH transmission includes transmitting the first PUSCH transmission as a non-codebook based transmission using a first precoding matrix; and the transmitting, by the UE, of the second PUSCH transmission includes transmitting the second PUSCH transmission as a non-codebook based transmission using a second precoding matrix, different from the first precoding matrix.

In some embodiments, the method further includes: indicating, by the UE, using a first non-codebook based Sounding Reference Signal (SRS) instance, the first precoding matrix; and indicating, by the UE, using a second non-codebook based Sounding Reference Signal instance, the second precoding matrix.

In some embodiments, the method further includes: sending a Physical Random Access Channel (PRACH) preamble in a first Random Access Channel (RACH) Occasion (RO); and sending the PRACH preamble in a second RO.

In some embodiments, the UE does not initiate a Random Access Response (RAR) monitoring window after sending the PRACH preamble in the first RO and before sending the PRACH preamble in the second RO.

According to an embodiment of the present disclosure, there is provided a User Equipment (UE), including: a processing circuit; and a radio, the processing circuit being configured to: transmit, in a first slot, a first Physical Uplink Shared Channel (PUSCH) transmission including a set of coded bits selected from a circular buffer of the UE based on a first redundancy version (RV); determine that a second slot is available for an earliest repetition of the first PUSCH transmission, the second slot being later than the slot immediately following the first slot; determine, based on the second slot, a second redundancy version; and transmit, in the second slot, a second PUSCH transmission including a set of coded bits selected from the circular buffer of the UE based on the second redundancy version, the second PUSCH transmission being a repetition of the first PUSCH transmission.

In some embodiments, the second PUSCH transmission is a Type A repetition of the first PUSCH transmission.

In some embodiments, the determining that the second slot is available for an earliest repetition of the first PUSCH transmission includes: receiving a slot format indicator (SFI); and determining that the second slot is a slot identified, by the SFI, as an uplink slot.

In some embodiments, the determining that the second slot is available for an earliest repetition of the first PUSCH transmission includes: missing a slot format indicator having a region of applicability having a beginning and an end and including a plurality of slots; and determining that the second slot occurs later than the end of the region of applicability.

In some embodiments, the processing circuit is further configured to: determine that no slots are available after a last scheduled PUSCH repetition and before an end of a maximum PUSCH transmission duration interval, and not transmit a PUSCH repetition after the last scheduled PUSCH repetition.

In some embodiments, the processing circuit is further configured to: receive an indication from a network node (gNB) that a third slot is available for a PUSCH repetition; receive an indication from the gNB that the third slot is not available for a PUSCH repetition; and determine that the third slot is not available for a PUSCH repetition.

In some embodiments: the transmitting of the first PUSCH transmission includes transmitting the first PUSCH transmission as a non-codebook based transmission using a first precoding matrix; and the transmitting of the second PUSCH transmission includes transmitting the second PUSCH transmission as a non-codebook based transmission using a second precoding matrix, different from the first precoding matrix.

In some embodiments, the processing circuit is further configured to: indicate, using a first non-codebook based Sounding Reference Signal (SRS) instance, the first precoding matrix; and indicate, using a second non-codebook based Sounding Reference Signal instance, the second precoding matrix.

In some embodiments, the processing circuit is further configured to: send a Physical Random Access Channel (PRACH) preamble in a first Random Access Channel (RACH) Occasion (RO); and send the PRACH preamble in a second RO.

According to an embodiment of the present disclosure, there is provided a User Equipment (UE), including: means for processing; and a radio, the means for processing being configured to: transmit, in a first slot, a first Physical Uplink Shared Channel (PUSCH) transmission including a set of coded bits selected from a circular buffer of the UE based on a first redundancy version (RV); determine that a second slot is available for an earliest repetition of the first PUSCH transmission, the second slot being later than the slot immediately following the first slot; determine, based on the second slot, a second redundancy version; and transmit, in the second slot, a second PUSCH transmission including a set of coded bits selected from the circular buffer of the UE based on the second redundancy version, the second PUSCH transmission being a repetition of the first PUSCH transmission.

BRIEF DESCRIPTION OF THE DRAWINGS

These and other features and advantages of the present disclosure will be appreciated and understood with reference to the specification, claims, and appended drawings wherein:

FIG. 5A is a table of redundancy version (RV) indices, according to an embodiment of the present disclosure;

DETAILED DESCRIPTION

Figure 1:
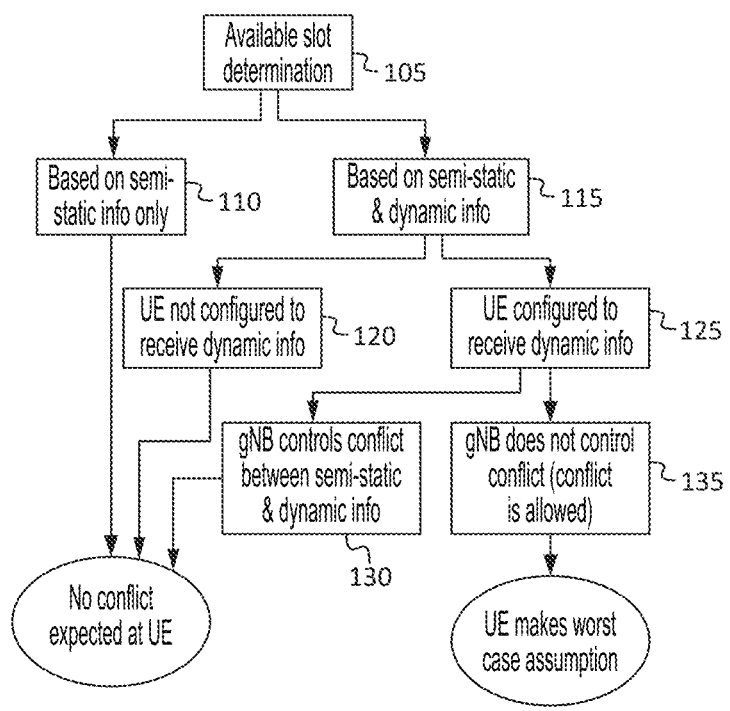
FIG. 1 is a dissection of cases for User Equipment (UE) and network node behavior with respect to failsafe mechanisms, according to an embodiment of the present disclosure.

The detailed description set forth below in connection with the appended drawings is intended as a description of exemplary embodiments of a system and method for PUSCH and PRACH enhancements provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In Rel-16 of the 5G specification, a user equipment (UE) may be scheduled to perform an uplink (UL) Physical uplink Shared Channel (PUSCH) transmission with repetitions.

Moreover, when the PUSCH is scheduled via a Downlink Control Information (DCI) with non-codebook based (NCB) transmission, the UE uses the same precoding for all PUSCH transmissions, and the UE uses the latest sounding reference signal (SRS) instance before the physical downlink control channel (PDCCH) scheduling the DCI for determining the precoding of the PUSCH. When the maximum number of PUSCH transmissions scheduled by the DCI is increased, the UE may therefore be forced to use the same precoding for a longer duration in time. This may have a detrimental effect on the PUSCH decodability. Therefore, it may be beneficial to allow the UE to change the precoding used for the NCB PUSCH repetitions that are scheduled via a DCI. As used herein, the phrase "user equipment" is used as a countable noun even though the noun it contains ("equipment") may not be countable in ordinary English. Similarly, the phrase Downlink Control Information (DCI) is also used as a countable noun.

The mechanism for type A PUSCH repetition may be enhanced such that the number of PUSCH repetitions are counted on the basis of available slots. In this enhancement, the determination of PUSCH repetitions may be done based on the available slots, which may not necessarily be consecutive slots. The definition of available slots may be based on multiple factors, such as time division duplex (TDD) configurations, dynamic slot format indicator (SFI) indication, cancellation indication, and others. If the definition of available slots is based on dynamic indications, a UE may be in a situation in which the dynamic indication of the information needed for slot availability determination is missed, in which case the UE and the network node (gNB) may have a misalignment regarding the determination of available slots. In light of this, failsafe mechanisms may be established to avoid such misalignment.

When the number of PUSCH repetitions is counted on the basis of available slots, a set of K scheduled PUSCH transmissions may span a large number of consecutive slots when the TDD configuration contains several downlink (DL) slots between UL slots. For example, considering a TDD configuration of the form DDDU (downlink/downlink/downlink/uplink), a PUSCH scheduled with 16 transmissions (initial transmission+15 repetitions) would be configured with the same redundancy version (RV) index according to the Rel-16 procedure of determining RV indices, which may exhibit inferior decoding behavior for the PUSCH (compared to transmissions using different RV indices). In addition, with a large number of repetitions, it may be difficult for the gNB to avoid such situations by suitable scheduling of the PUSCH and TDD configuration.

In Coverage Enhancement (CE) scenarios, the physical random access channel (PRACH) signal is an UL signal which is degraded in decoding performance due to low signal to noise ratio (SNR). In order to enhance its performance, PRACH repetition may be a viable solution. However, introducing a working PRACH repetition mechanism in Rel-17 which is efficient as well as backward compatible with Rel-16 is a challenge.

As such, it may be advantageous to make various enhancements to methods for PUSCH transmissions, as described herein. The enhancements described herein may be applicable to the scheduling of any PUSCH transmission, including, but not limited to, Msg3 transmissions and re-transmissions. Some embodiments provide an enhancement to NCB PUSCH transmission with repetition.

In some embodiments, the UE does not necessarily use the same precoding matrix for all repetitions of the NCB PUSCH transmission. In some embodiments, the UE may have a capability regarding whether the UE can change the precoding of NCB PUSCHs between repetitions. In some embodiments, the UE changes the precoding of the NCB PUSCH repetitions in various ways. For example, the UE may change the precoding of each repetition. In such an embodiment, the UE may correspondingly use an NCB SRS instance to indicate to the gNB the precoding used for each PUSCH repetition. Therefore, an NCB SRS instance may be present before each PUSCH repetition. The UE may change the precoding after each new transmission of a NCB SRS instance. For example, the UE may update its precoding matrix whenever there is a chance for the UE to send an NCB SRS to the gNB and therefore allow the gNB to adapt its receiver according to the new precoding matrix.

In both of the above approaches, the UE does not require an indication from the gNB with an SRS Resource Indicator (SRI) to determine which precoding to use. Rather, the UE may use the same SRI indicated in the initial DCI scheduling the NCB PUSCH with repetition. The goal of the NCB SRS instance transmission is therefore to inform the gNB of the new precoding matrix without waiting for an SRS resource selection and a corresponding SRI transmission from the gNB. The UE may change the precoding after a fixed number of repetitions. For example, the UE may use the same precoding matrix for, e.g., 16 repetitions, and if more repetitions are scheduled, the UE may update the precoding matrix and send a corresponding NCB SRS instance. The UE may update the precoding matrix after the fixed number of repetitions if possible, that is, if there is indeed an available SRS transmission instance which happens sufficiently before the corresponding PUSCH. If no such SRS instance exists, the UE does not update the precoding matrix. This operation may be better suited for situations in which the NCB SRS is configured periodically or semi-statically. The UE may trigger an SRS transmission whenever the precoding is required to be changed, that is, after the fixed number of repetitions. This operation may be better suited for situations in which the NCB SRS is an aperiodic SRS configuration.

The transmission of all NCB SRS instances mentioned in the above-described methods may occur sufficiently before their corresponding PUSCH transmissions (i.e., the transmissions which use the same precoding matrix). Here, "sufficiently before" may mean sufficiently in advance of the PUSCH transmissions to allow the gNB to make use of the SRS transmission to adapt its receiver operation for better reception and decoding of the corresponding PUSCH. That is, a timeline may exist between the NCB PUSCH and its corresponding SRS instance to allow the receiver operation of the gNB.

In some embodiments, enhancements may be made to Type A PUSCH repetition methods. For example, some embodiments include enhancements to establish failsafe mechanisms for Type A PUSCH repetition with counting based on available slots. The failsafe mechanisms depend on the behavior and configuration of the UE and gNB, which leads to different cases as shown in FIG. 1. In FIG. 1, a determination, at 105, regarding whether a slot is available, may be made, at 110, based only on semi-static information (in which case no conflict is expected at the UE) or, at 115, based on both semi-static and dynamic information. In the latter case, if (i) (at 120) the UE is not configured to receive dynamic information, or if (at 125) the UE is configured to receive dynamic information and (at 130) the network node (gNB) controls (i.e., avoids) conflicts between the static information and the dynamic information sent to the UE, then no conflict is expected at the UE; if (ii) (at 135) the gNB does not control conflict, then the UE may receive conflicting information (e.g., regarding whether a slot or a symbol is configured for uplink or downlink) and the UE may make the worst case assumption, i.e., that the slot or symbol is not available for uplink.

In some embodiments, the UE may determine the available slots of the PUSCH repetitions based on either semi-static information or on both semi-static and dynamic information. If the UE determines available slots based on semi-static and dynamic information, there is a chance that the UE will miss the dynamically indicated information needed for the determination of available slots. In this case, there may be a misalignment between the gNB and the UE on the understanding of available slots for PUSCH repetition transmissions. In this case, failsafe mechanisms may be implemented to control such a misalignment. Such a misalignment may lead to 1) a UE transmitting a PUSCH in a slot in which the gNB does not expect to receive such a transmission, or 2) a UE not transmitting a PUSCH in a slot in which the gNB expects to receive such a transmission. Case 2) may lead to a waste in available transmission resources due to the missing of a transmission opportunity; however, case 1) may cause an error in other transmissions in the network since such a slot may be used by the gNB to schedule other transmissions. Therefore, a failsafe mechanism may err on the side of caution and attempt to maintain case 2) whenever misalignment may happen.

In one such mechanism, a UE may make worst-case assumptions regarding the resources that are candidates to be available resources for PUSCH transmissions. Namely, if the UE expects to receive dynamic information to be used for the determination of available slots, and the dynamic information expected from the gNB may render some slots available for PUSCH transmissions, then the UE does not assume these slots are available for transmission if it does not receive explicit dynamic information which renders these slots as available.

In one realization of this mechanism, the dynamic information may be the reception of an SFI indication by the UE indicating that slots or symbols are available for UL transmission. Namely, a UE may be configured with semi-static TDD configurations. In addition, the UE may be RRC configured to expect SFI indications at certain time locations indicating slot formats for a set of upcoming slots. These upcoming slots may be indicated via semi-static TDD configurations as flexible (F), and the SFI indication may further indicate such symbols as uplink (U), downlink (D) or F. If the UE wishes to determine some slots to be available or unavailable for PUSCH transmission, and an SFI for these slots is expected to be transmitted to the UE, the UE assumes the slots to be not available for PUSCH transmission if it does not receive the SFI. If the UE is not expected to receive an SFI from the gNB for a set of slots, the UE may make the determination of slot availability based on its semi-static configurations.

In another mechanism, the gNB may indicate to the UE a certain set of slots, or symbols, or resources in which dynamic information does not affect the determination of the availability of such slots, or symbols, or resources. In one realization of this mechanism, the gNB may indicate to the UE a certain invalid pattern which indicates that some slots, or symbols, or resources are considered invalid (i.e., unavailable for PUSCH transmissions) regardless of any dynamic information transmitted by the gNB. This invalid pattern may be semi-statically configured by the gNB. The applicability of this invalid pattern may be made semi-statically or dynamically.

In another realization of the mechanism, the gNB may indicate to the UE certain slots, or symbols, or resources which may be determined to be available or unavailable for PUSCH transmissions using semi-static information only. In this case, the gNB may ensure that the UE does not receive dynamic information which indicates such slots, or symbols, or resources to be unavailable. Alternatively, the UE may ignore dynamic information which indicates that these slots, or symbols, or resources are not available for PUSCH transmission. This dynamic information may be, e.g., in the form of an SFI indication, a Cancellation Indication (CI), or another kind of indication. The semi-static information may be in the form of, e.g., TDD configurations or other kinds of information.

The behavior of the UE and of the gNB may be different depending on the nature of the PUSCH transmission and the dynamic information. For example, if the UE is scheduled with a dynamic grant PUSCH (DG-PUSCH) and the dynamic information is in the form of a dynamic SFI, the gNB behavior may be to ensure that no conflict can happen, e.g., the two scheduled transmissions do not conflict. Or, if the UE is scheduled with a configured grant PUSCH (CG-PUSCH), the gNB may allow a conflict to exist between the CG-PUSCH and the dynamic SFI, and the UE may therefore assume the worst-case situation, i.e., it may refrain from sending the CG-PUSCH unless an explicit SFI indication is available to allow the determination of the availability of resources for carrying the CG-PUSCH. In another example, the UE assumes the worst-case situation for either type of PUSCH.

Figure 2A:
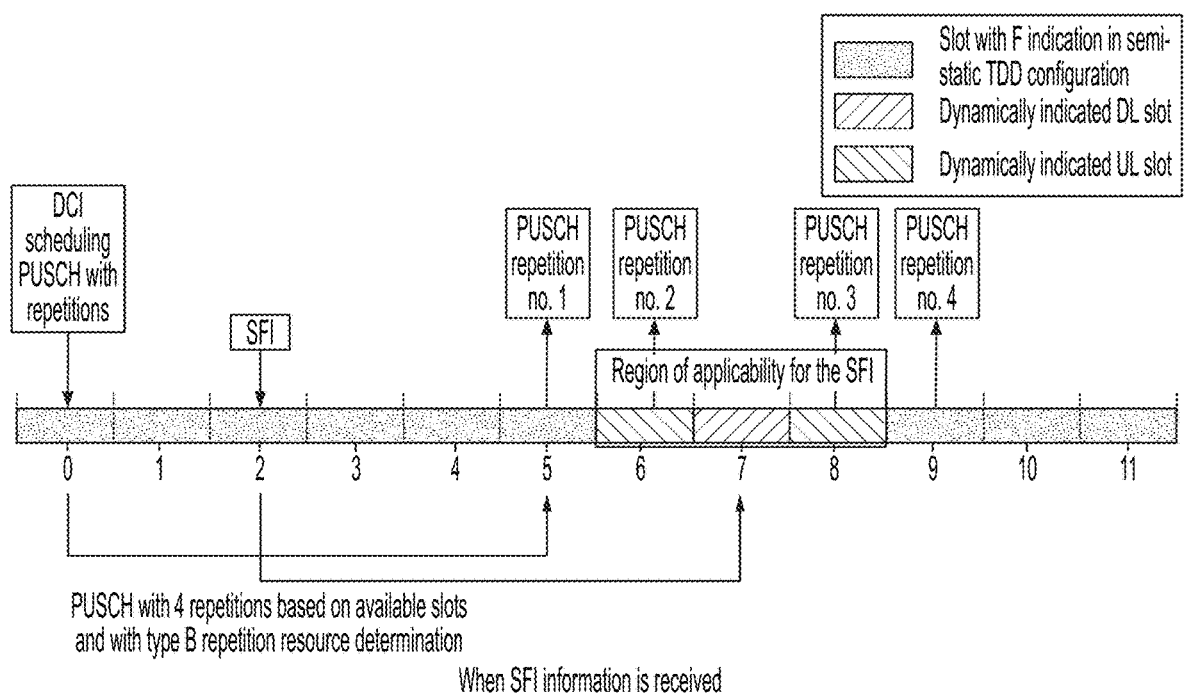
FIG. 2A is an example of UE operation when a slot format indicator (SFI) is received, according to an embodiment of the present disclosure.
Figure 2B:
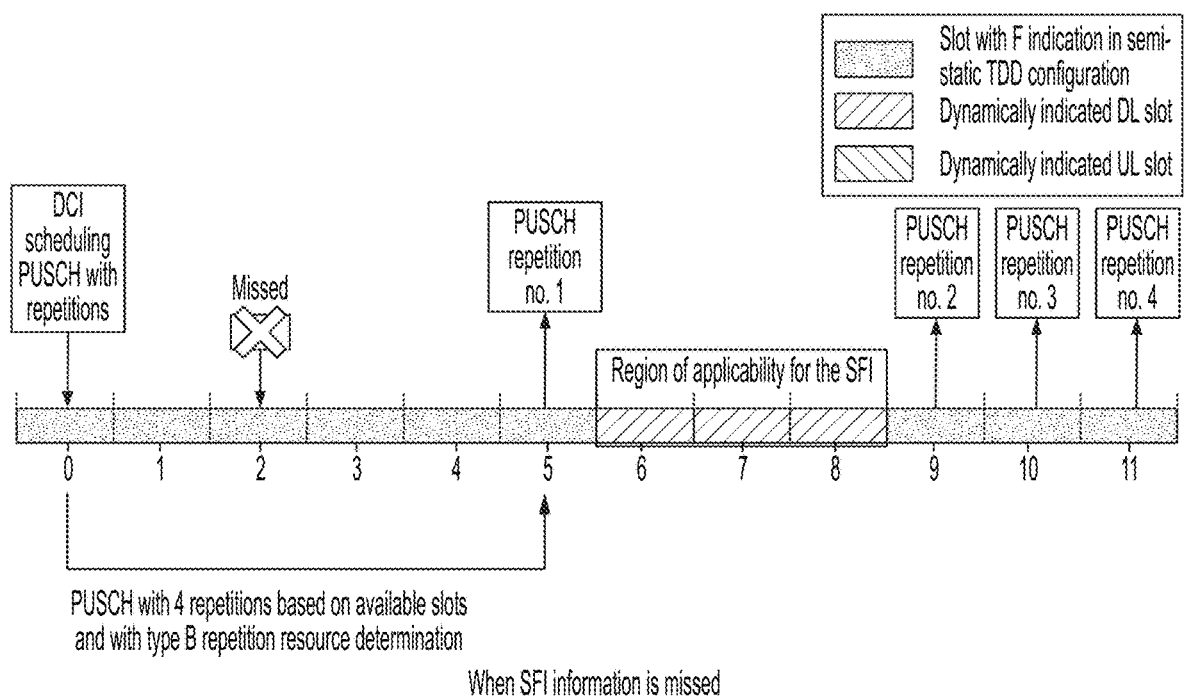
FIG. 2B is an example of UE operation when a slot format indicator is missed, according to an embodiment of the present disclosure.

In another realization of the mechanism, the UE may receive indications with conflicting dynamic information regarding slot availability for PUSCH transmission. When some such dynamic information is missing, the UE may make worst-case assumptions about this missing information and determine slot availability accordingly. For example, in some situations, the UE may be scheduled with DG-PUSCH with repetitions, and the resources for these repetitions may be determined based on mechanisms similar to the ones used for resource determination in Type B PUSCH repetition. In addition, the UE may receive dynamic SFI information which specifies some of these resources as DL. If the information regarding both the DG-PUSCH allocation and the dynamic SFI is received, the UE may then avoid resources with SFI-indicated DL symbols when determining the resources for the PUSCH repetitions. On the other hand, if the SFI information is not received by the UE, the UE may then assume a worst-case SFI indication of resources as DL and schedule the PUSCH accordingly. With such operation, the UE can use later resources for the PUSCH transmission which are not affected by the potentially-missed SFI indication. Examples of this operation are shown in FIGS. 2A and 2B.

In the aforementioned case, the semi-static configuration of later slots (slots 9, 10 and 11) which the UE attempts to use for PUSCH transmission after slots are rendered unavailable due to dynamic information may be configured as F. While UL transmission may be allowed in flexible symbols, the original indication of the DG-PUSCH and the scheduled dynamic SFI was configured by the gNB to schedule UL transmission for the UEs in earlier slots (slots 6, 7 and 8), and therefore those later flexible slots (slots 9, 10 and 11) were not originally intended to carry UL transmissions from that UE and that particular PUSCH. In fact, as a result of having missed the SFI information, the UE may attempt to transmit PUSCHs in those slots which may be scheduled by the gNB for other transmissions by other UEs.

Figure 3A:
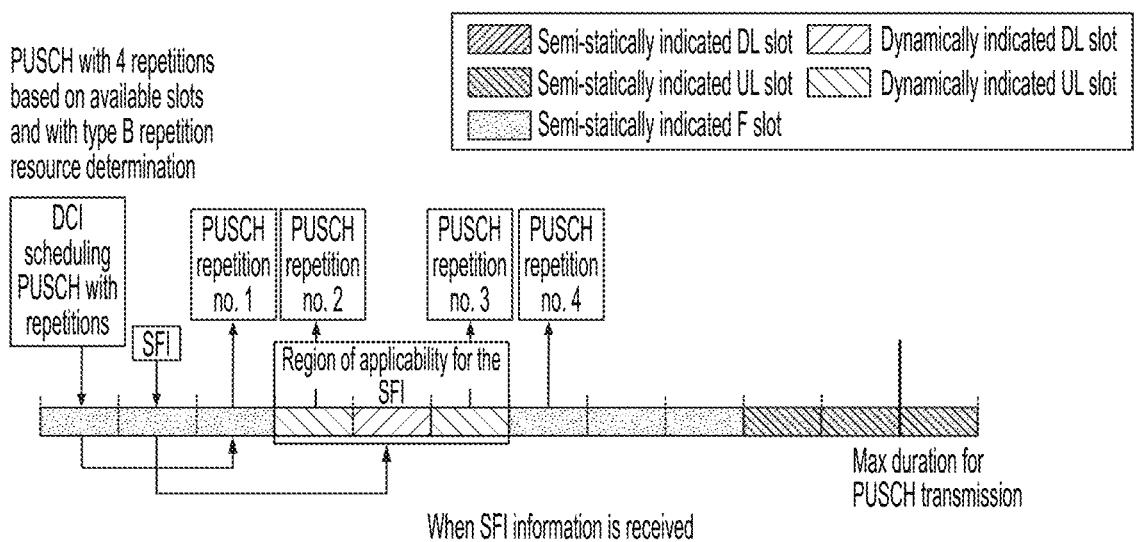
FIG. 3A is an example of UE operation when a slot format indicator is received, according to an embodiment of the present disclosure.

Therefore, the UE operation may be to avoid using slots that are semi-statically indicated as F symbols to avoid potential interference with other signals. In this case, the UL transmission of the PUSCHs may be postponed until later slots that are available for UL transmission. If the postponement of some PUSCHs extends beyond a maximum allowable duration for the transmission of this PUSCH with repetitions, then these transmissions may be dropped. An example of this operation is shown in FIGS. 3A (in which the SFI is received) and 3B (in which the SFI is missed).

Figure 3B:
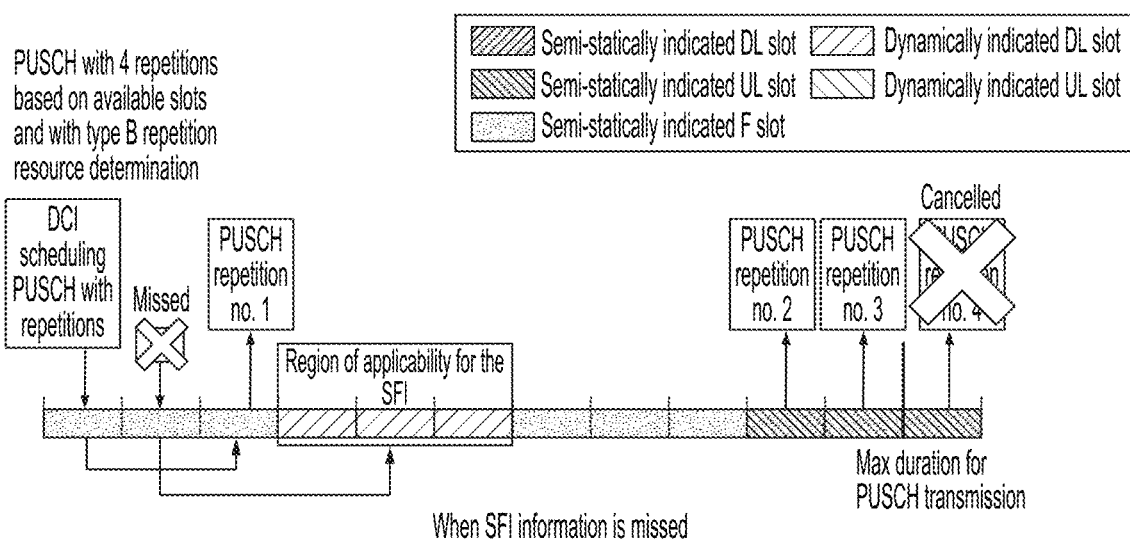
FIG. 3B is an example of UE operation when a slot format indicator is missed, according to an embodiment of the present disclosure.
Figure 4:
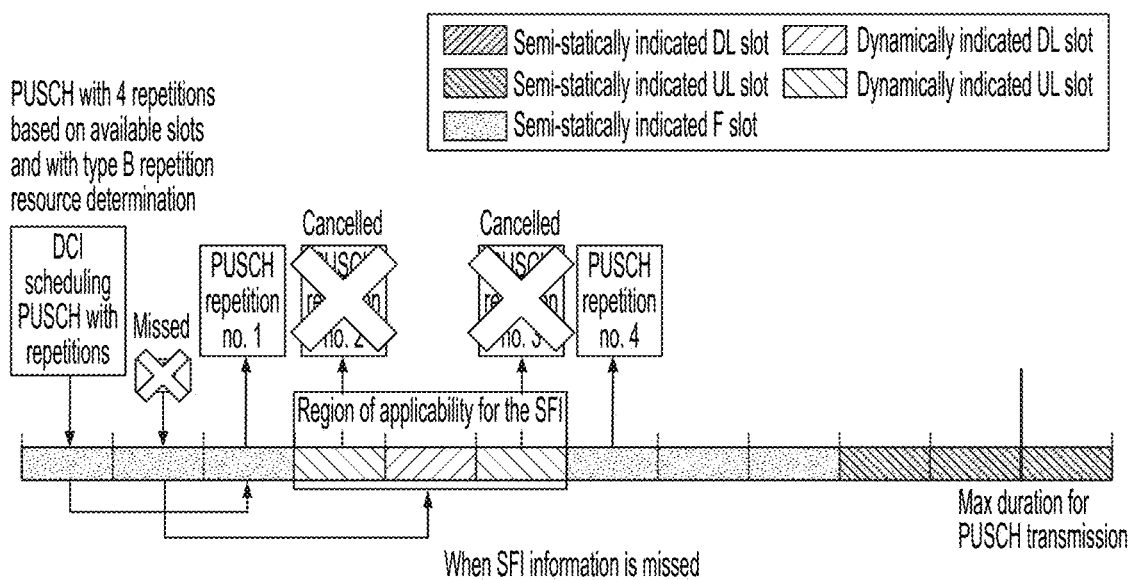
FIG. 4 is an example of UE operation when a slot format indicator is received, according to an embodiment of the present disclosure.

In another mechanism, when some such dynamic information (such as an SFI) is missing, the UE may drop the PUSCH transmission in regions which may be affected by the missed information, as shown in FIG. 4. FIG. 4 shows an example of UE operation when an SFI is received or missed with a PUSCH scheduled with repetition, resource counting based on available slots and with repetition Type B like resource determination. In the example of FIG. 4, if the SFI is missed, the PUSCHs lying in the region of applicability for the SFI are dropped, instead of being postponed as in the example of FIG. 3B.

Some embodiments include an enhanced mechanism for RV determination of type A PUSCH repetitions. Namely, when Type A PUSCH repetitions are scheduled based on actual (i.e., available) slots, the mechanism determines the RV index of the PUSCH transmissions based on the actual transmissions instead of the slot position among the set of consecutive slots. Namely, among the set of K actual PUSCH transmissions, the RV index of the kth actual PUSCH transmission is determined according to the table of FIG. 5A. As used herein, a "Type A" PUSCH repetition is either a legacy Type A PUSCH repetition or an enhanced Type A PUSCH repetition, i.e., a legacy Type A PUSCH repetition enhanced with some or all of the enhancements described herein.

Figure 5B:
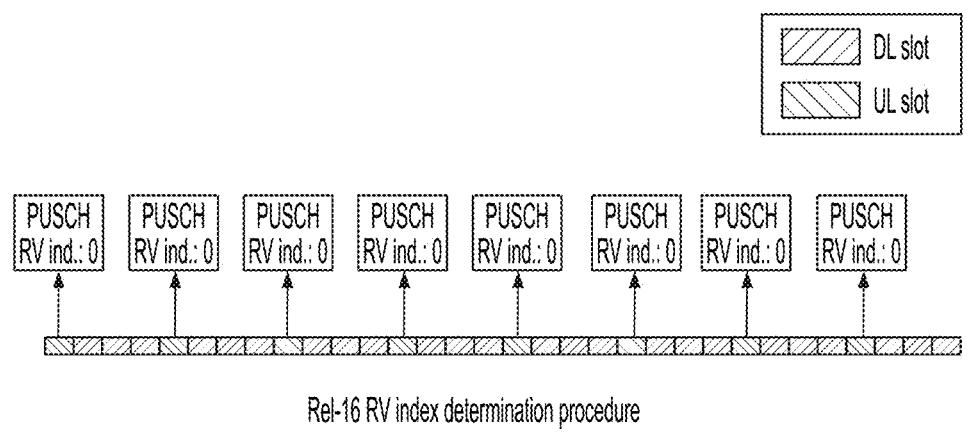
FIG. 5B is an illustration of an example of an RV index determination procedure, according to an embodiment of the present disclosure.
Figure 5C:
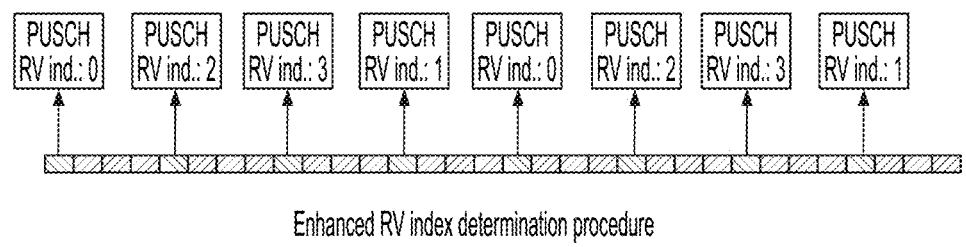
FIG. 5C is an illustration of an example of an enhanced RV index determination procedure, according to an embodiment of the present disclosure.

The aforementioned behavior is shown in FIGS. 5B and 5C which show (i) an example of RV determination according to legacy Type A PUSCH repetitions, and (ii) an example for an enhanced RV index determination procedure, respectively. The assumed TDD configuration is DDDU and a PUSCH is scheduled with 8 actual repetitions based on the Type A repetition mechanism. In these examples, a PUSCH is scheduled with Type A repetition with 8 repetitions counted based on actual transmissions, and the RV index configured for the initial PUSCH transmission is 0. The example of FIG. 5B shows that the Rel-16 mechanism for RV index determination would configure all transmissions with RV index 0. However, as shown in FIG. 5B, with the enhanced RV index determination scheme (which determines the RV based on available slots, instead of consecutive slots), the PUSCH transmissions would cycle twice through all PUSCH transmissions, which would provide better decoding performance.

If an RV sequence is configured for the use of PUSCH transmissions, then cycling through the RV indices indicated by the sequence may be based on the index of the actual transmission. For example, if an RV sequence {0, 2, 3, 1} is defined, then the RV index of the $i^{th}$ actual transmission (happening in slot n) may be specified based on the index i. For example, the RV index in the sequence may be determined as (i−1)mod 4+1.

Figure 5D:
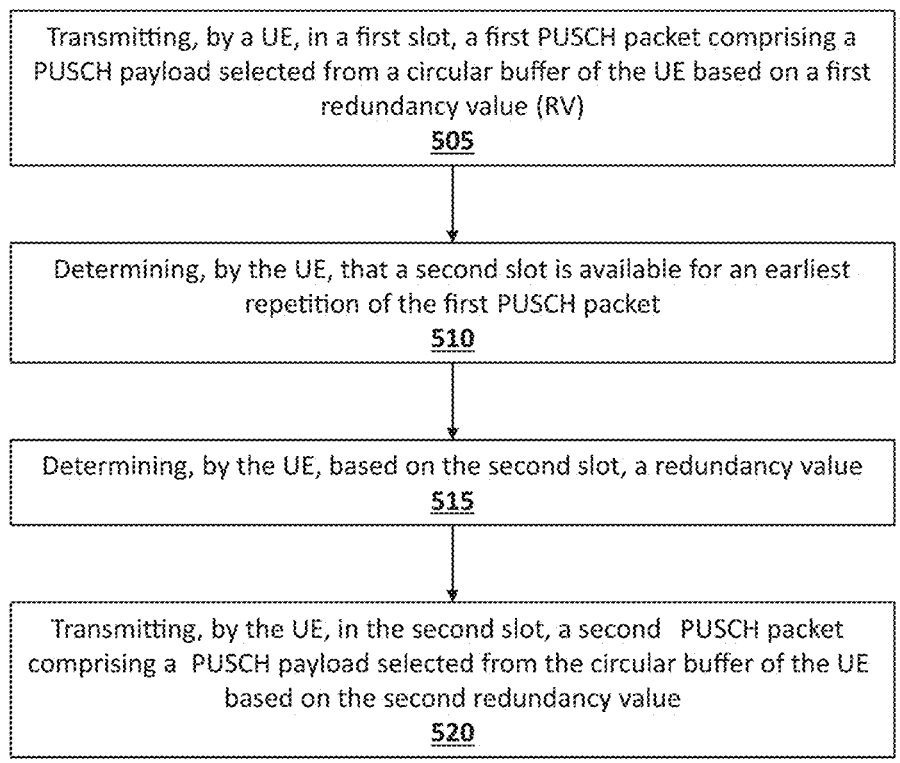
FIG. 5D is a flowchart of a method, according to an embodiment of the present disclosure.

As illustrated in FIG. 5D, a method for PUSCH repetition and RV determination may proceed as follows. The method may include transmitting, at 505, by a UE, in a first slot, a first PUSCH transmission comprising a set of coded bits selected from a circular buffer of the UE based on a first redundancy version (RV); determining, by the UE, at 510, that a second slot is available for an earliest repetition of the first PUSCH transmission, the second slot being later than the slot immediately following the first slot; determining, by the UE, at 515, based on the second slot, a second redundancy version; and transmitting, by the UE, at 520, in the available slot, a second PUSCH transmission comprising a set of coded bits selected from the circular buffer of the UE based on the second redundancy version. The second PUSCH transmission may be a repetition of the first PUSCH transmission. As used herein, when a second PUSCH transmission is a "repetition" of a first PUSCH transmission it means that the set of coded bits of the second PUSCH transmission is selected from a circular buffer containing the same data as the data from which the set of coded bits of the first PUSCH transmission was selected (the sets of coded bits need not be identical, and may differ if different redundancy versions were used for the respective selections).

In some embodiments, PRACH signal transmission may be performed with aggregation, in a manner that is in some respects analogous to the transmission of PUSCHs with repetition. A first set of embodiments may be referred to as Scheme 1. This scheme involves PRACH signal transmission with aggregation, e.g., a Rel-17 UE may send multiple PRACH signals in a sequence of Random Access Channel (RACH) Occasions (ROs), without initiating a Random Access Response (RAR) response monitoring window after each transmission. This is in contrast to Rel-16 PRACH signal repetition, in which a UE initiates a RAR response monitoring window after each PRACH transmission, and only sends a retransmission if the window expires without receiving a corresponding RAR message. A UE may utilize PRACH signal transmission with aggregation in different ways, e.g., as described below for a first embodiment and a second embodiment.

In the first embodiment, a UE may send each of the PRACH transmissions using the same uplink transmit (UL-Tx) beam. This may allow the gNB to improve the received signal to interference and noise ratio (SINR) of the received PRACH signal. Alternatively, the gNB may also use these aggregated PRACH transmissions to perform a form of uplink receive (UL-Rx) beam refinement, in which the gNB attempts to receive each of the PRACH aggregated transmissions using a different receive (Rx) beam. The set of Rx beams used by the gNB may be a set of narrow beams which collectively cover the range of the originally used broad Rx beam. Upon receiving the PRACH aggregated transmissions using different beams, the gNB determines the best one.

Figure 6A:
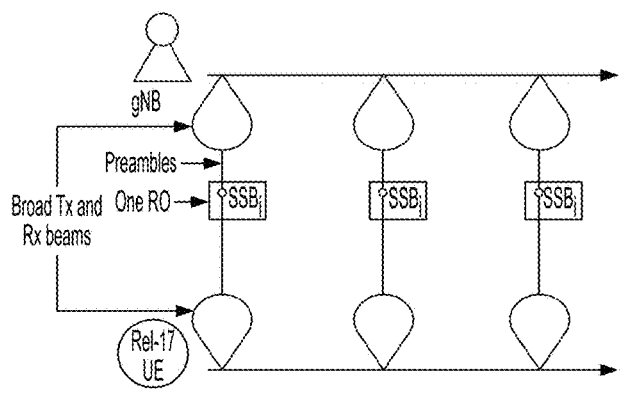
FIG. 6A is an illustration of beams used in PRACH aggregated transmission, according to an embodiment of the present disclosure.
Figure 6B:
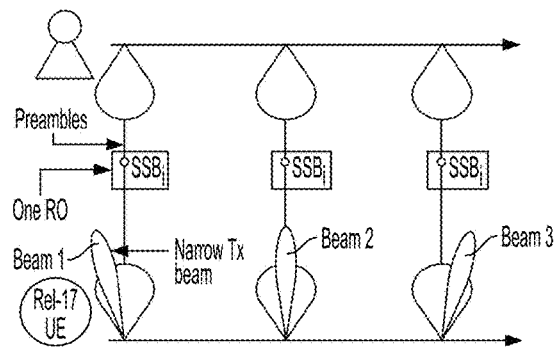
FIG. 6B is an illustration of beams used in PRACH aggregated transmission, according to an embodiment of the present disclosure.
Figure 6C:
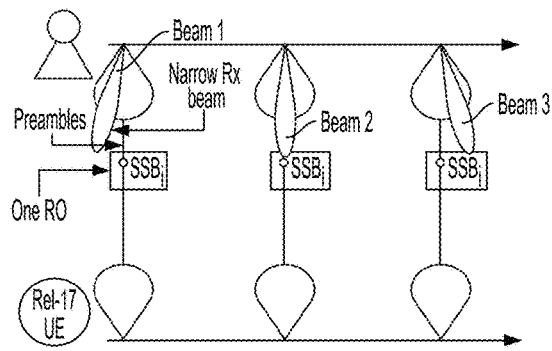
FIG. 6C is an illustration of beams used in PRACH aggregated transmission, according to an embodiment of the present disclosure.

In the second embodiment, the UE may send each of the aggregated PRACH transmissions using a different UL-Tx beam in an attempt to perform UL-Tx beam refinement. The gNB may then indicate to the UE which UL-Tx beam is the best. The set of Tx beams used by the UE may be a set of narrow beams which collectively cover the range of the originally used broad Tx beam. The UE may then be provided with information which aids the UE in determining which Tx beam was best received by the gNB. These embodiments are shown in FIGS. 6A-6C, with FIG. 6A illustrating the use of unchanging beams, FIG. 6B showing the use of different transmit beams, and FIG. 6C showing the use of different receive beams.

In both of these embodiments, sending one PRACH signal which consists of preamble repetitions may be used by the gNB to perform a kind of UL-Rx beam refinement within those preamble repetitions. This is a mechanism which may be employed by the gNB using Rel-16 PRACH transmissions, and may still be employed on top of (i.e., in combination with) the PRACH aggregated transmissions described herein.

In Rel-16 PRACH signal repetition, a UE applies a power ramping behavior which increases the transmission power associated with each PRACH transmission. Rel-17 PRACH transmission with aggregation may have a similar power ramping behavior as in Rel-16. This power ramping behavior may be configured with the same or different power ramping parameters. In other embodiments, Rel-17 PRACH transmission with aggregation may opt to use the same transmission power in all PRACH signals.

In a set of embodiments that may be referred to as Scheme 2, a RACH mechanism for Rel-17 UEs with CE capabilities is performed alongside Rel-16 UEs in the same resources. Namely, the Rel-17 RACH procedure allows UEs to transmit PRACH signals with aggregation in the same resources indicated for a Rel-16 RACH procedure, i.e., the same ROs and preambles.

Figure 7:
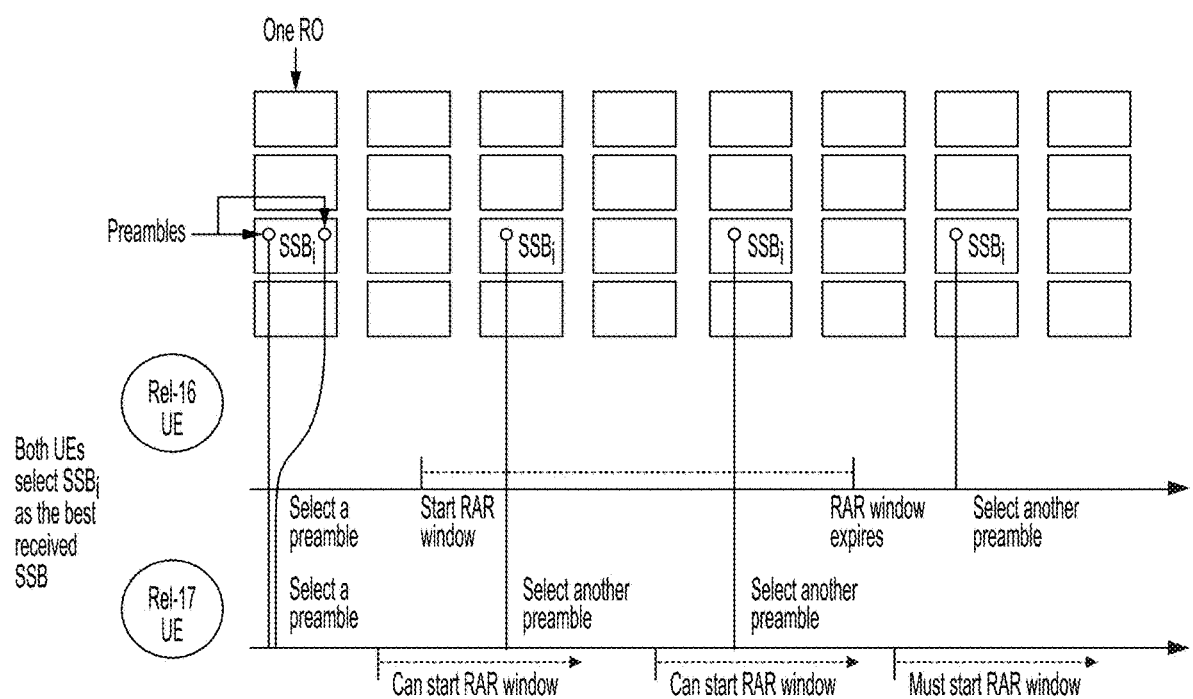
FIG. 7 is an illustration of an example of the behavior of a Rel-16 UE and a Rel-17 UE with 3-level PRACH aggregation, according to an embodiment of the present disclosure.

With this scheme, a Rel-16 UE follows the legacy RACH procedure by picking a preamble and RO resource corresponding to the Synchronization Signal Block (SSB) index received with the highest reference signal received power (RSRP), and performing a PRACH transmission (of Msg1) in that RO. After the PRACH transmission, the UE starts a RAR response monitoring window which starts at the first Control Resource Set (CORESET) symbol after the PRACH transmission. The UE does not resort to PRACH retransmission unless the RAR window expires and a corresponding RAR is not received. Concurrently, a Rel-17 UE uses the same RO and preamble determination scheme as in the legacy RACH procedure. However, the Rel-17 UE sends PRACH signal repetitions in later ROs which are associated with the same SSB; the UE is not required to start a RAR window until it sends the last configured retransmission. Rel-16 and Rel-17 UE behaviors in this scheme are shown in FIG. 7. Note that a Rel-17 UE has the option to start a RAR window after any of the PRACH transmissions in the PRACH aggregation. This may facilitate an early termination of the RACH procedure as well as the procedure of UL-Tx beam refinement as described below.

In this scheme, a Rel-17 UE only sends PRACH signal with aggregations if the UE is in a Coverage Enhancement (CE) scenario. Namely, a UE makes such a decision based on the received RSRP of the best SSB index which it has selected. Such a decision may be made in different ways. For example, in a first embodiment, a UE may have a threshold $\gamma$, and the UE may use Rel-17 PRACH signal aggregations if the received RSRP of the best SSB is smaller than or equal to $\gamma$; otherwise it may use the Rel-16 approach.

Figure 8:
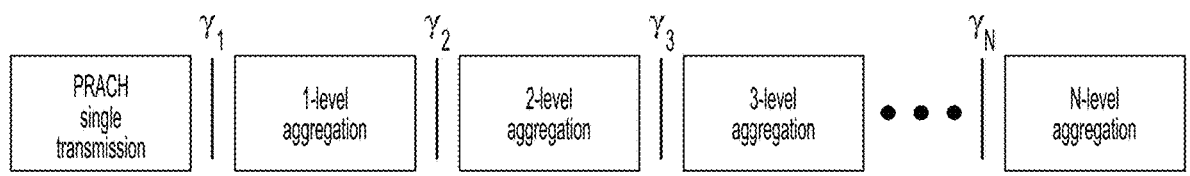
FIG. 8 is an illustration of the determination of PRACH aggregation level, according to an embodiment of the present disclosure.

In a second embodiment, a UE may have multiple thresholds $\gamma_1 \geq \gamma_2 \geq \gamma_3 \geq \ldots \geq \gamma_N$. If the received RSRP of the best SSB is larger than $\gamma_1$ then it uses Rel-16 PRACH transmission. If the received RSRP of the best SSB is larger than $\gamma_2$ and smaller than or equal to $\gamma_1$, then it uses Rel-17 PRACH signal aggregation with a certain number of retransmissions. If the received RSRP of the best SSB is larger than $\gamma_3$ and smaller than or equal to $\gamma_2$, then it uses Rel-17 PRACH signal aggregation with a larger number of retransmissions, and so on. FIG. 8 illustrates this process for determining PRACH aggregation level.

Configuring Rel-17 UEs with PRACH signal aggregation to perform their transmissions in the same resources as Rel-16 UEs may be considered as an unfair behavior, in the sense, for example, that such a behavior may lead to a higher collision rate for Rel-16 UEs, which increases latency in the initial access procedure. However, counterarguments may be made regarding these concerns. For example, a UE only performs PRACH signal aggregation if it is in a CE scenario. In this case, a single PRACH transmission experiences poor channel conditions and therefore is typically received with a low SNR. If this PRACH transmission collides with another PRACH signal from a Rel-16 UE, its effect is likely to amount to only limited interference levels, and therefore may not significantly impede the Rel-16 UE initial access procedure. Moreover, a Rel-17 UE in a CE situation may be thought as one in a naturally disadvantageous situation, since its PRACH transmissions are likely to be missed or not decoded. As such, the use of use of PRACH signal aggregation may be considered to be a mechanism available to a Rel-17 UE for compensating for a disadvantage, e.g., a poor SNR.

In this setting, a gNB receives PRACH signals without being able to associate these signals with either (i) Rel-16 UEs with single PRACH transmissions or (ii) Rel-17 UEs performing PRACH transmission with aggregation. In other words, from a gNB perspective, one Rel-17 UE performing PRACH transmission with, say, 5-level aggregation may be considered as 5 virtual Rel-16 UEs. This situation, if not appropriately handled, may lead to a misconfiguration of a Rel-17 UE which may receive various RAR messages each with different configurations and TC-RNTI.

One way to handle such a situation may be to configure the Rel-17 UE performing PRACH transmission with aggregation to respond to at most one RAR message corresponding to the preamble IDs of its PRACH transmissions. This allows the gNB to automatically rectify the issue of dealing with multiple virtual UEs as soon as the gNB receives at most one Msg3 corresponding to at most one of the set of virtual UEs. As used herein, a "preamble ID" refers to a complete identification of the preamble sequence used.

Alternatively, a Rel-17 UE may respond to more than one RAR message corresponding to the preamble IDs of its PRACH transmissions, but indicate in these RAR response messages which preamble IDs are those that are part of its PRACH transmissions. Upon decoding a RAR response message, the gNB is then made aware of the preamble IDs used by the same Rel-17 UE and may then act accordingly.

Figure 9A:
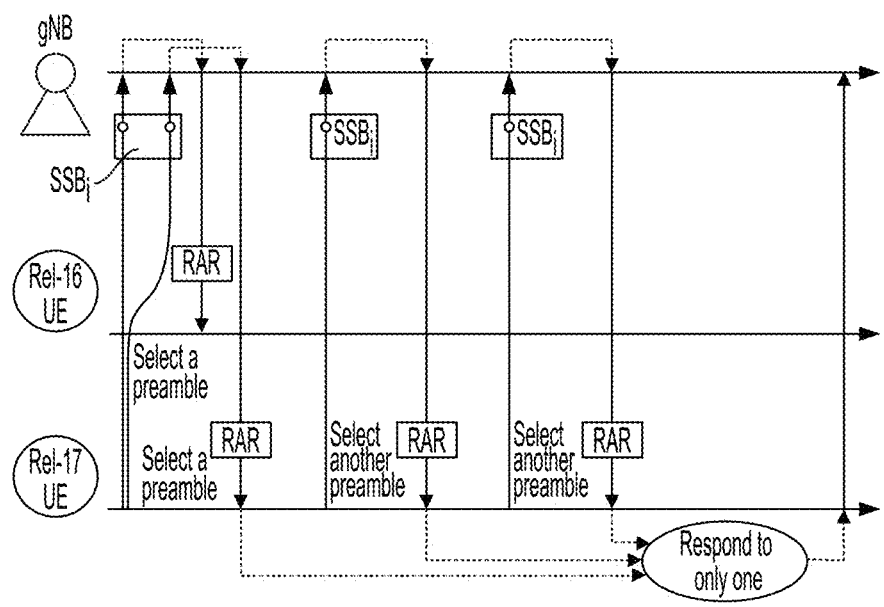
FIG. 9A is an illustration of PRACH aggregation, according to an embodiment of the present disclosure.
Figure 9B:
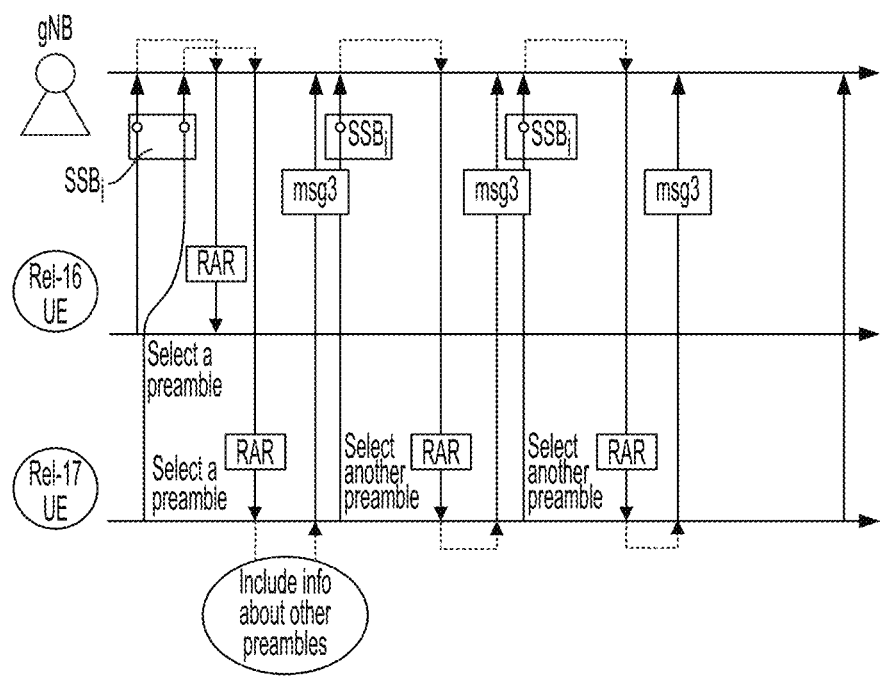
FIG. 9B is an illustration of PRACH aggregation, according to an embodiment of the present disclosure.
Figure 10A:
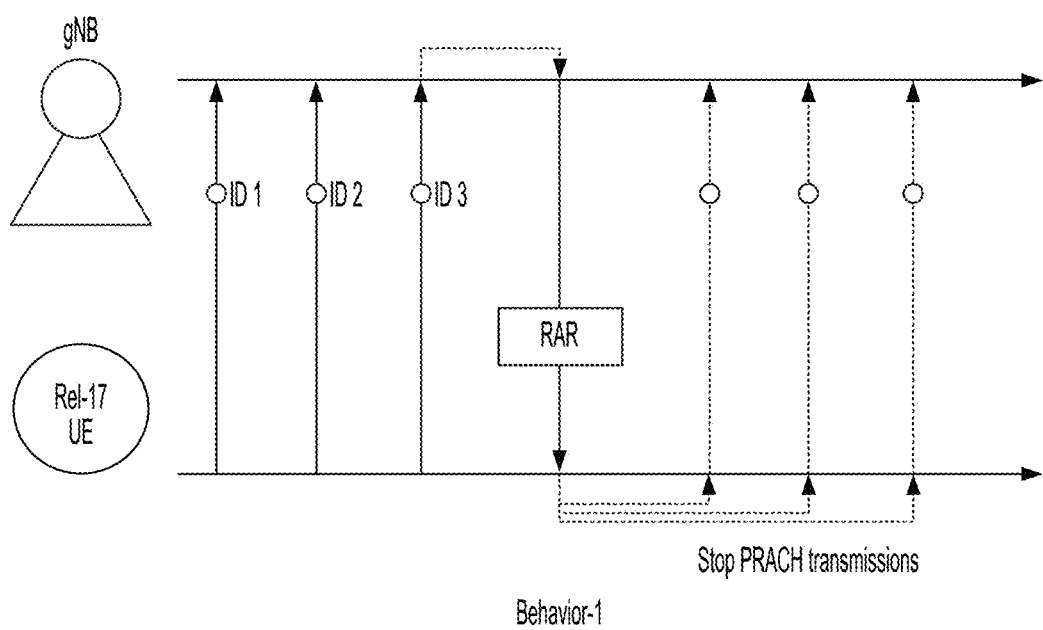
FIG. 10A is an illustration of PRACH aggregation, according to an embodiment of the present disclosure.
Figure 10B:
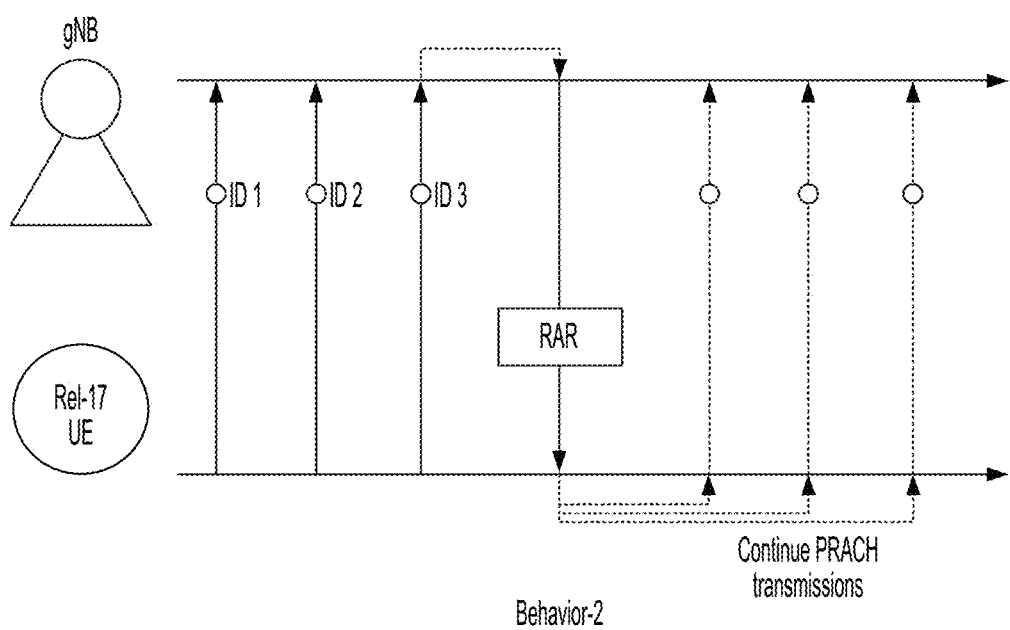
FIG. 10B is an illustration of PRACH aggregation, according to an embodiment of the present disclosure.
Figure 10C:
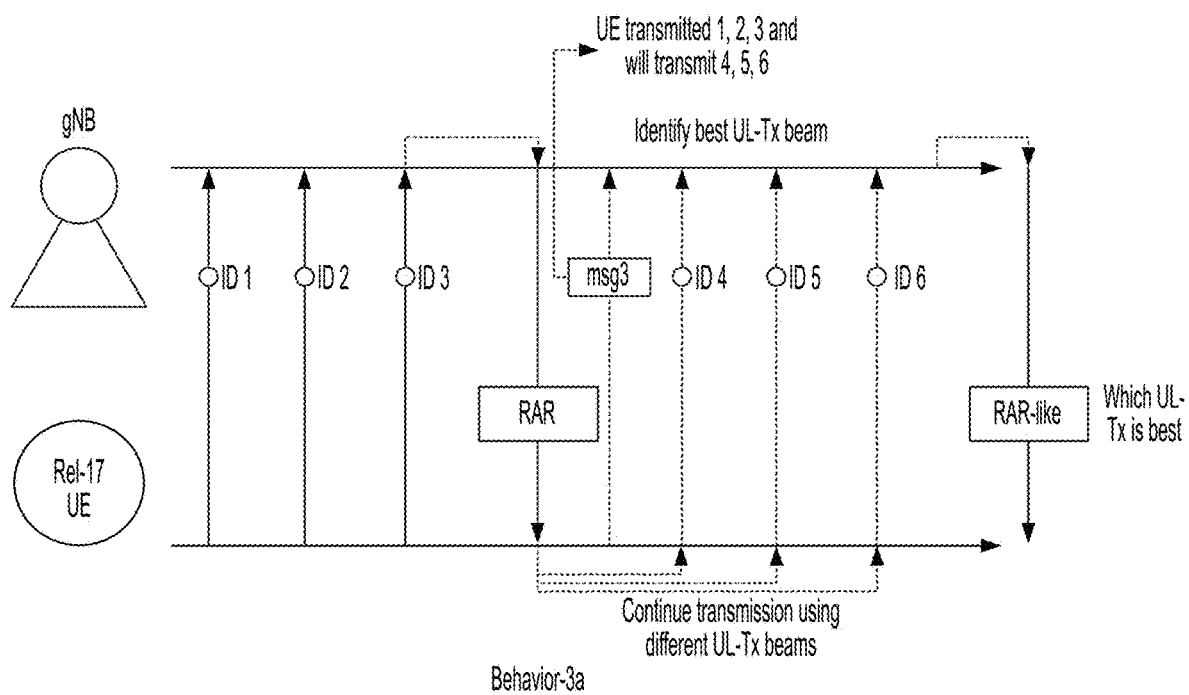
FIG. 10C is an illustration of PRACH aggregation, according to an embodiment of the present disclosure.
Figure 10D:
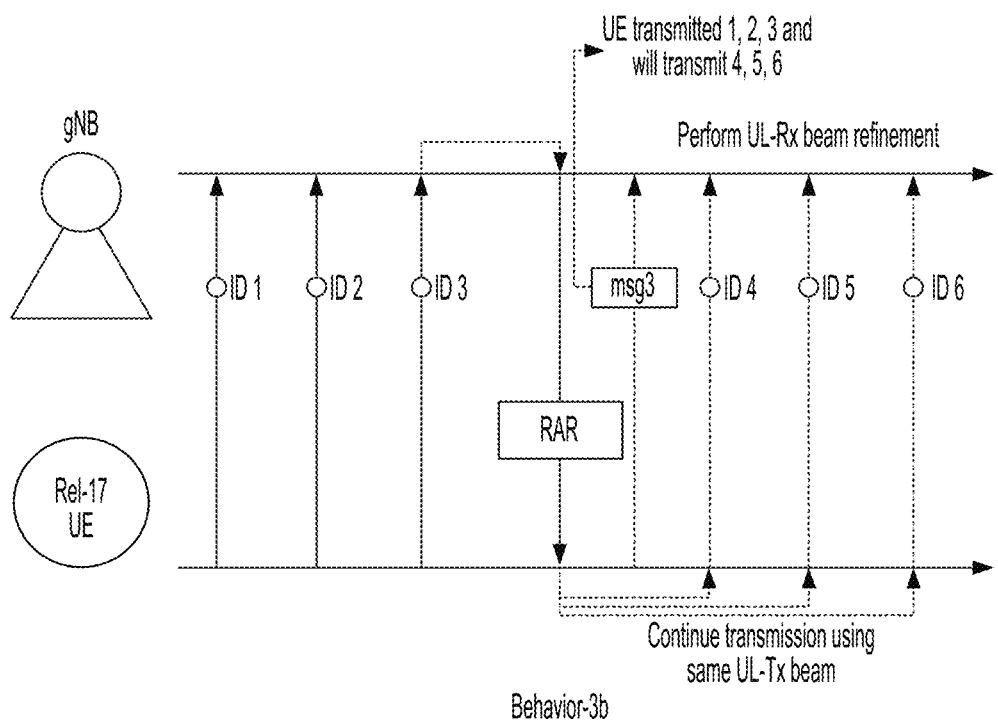
FIG. 10D is an illustration of PRACH aggregation, according to an embodiment of the present disclosure.

FIGS. 9A and 9B show examples of communications between the gNB and both types of UE when PRACH transmission with aggregation is enabled. A Rel-17 UE performing PRACH aggregated transmission may start a RAR window only after the transmission of the last PRACH repetition. The UE may use a different RAR window configuration than the one configured for a Rel-16 UE sending one PRACH transmission. In this case, the gNB may be aware of the potential PRACH aggregation sequences and send RAR messages in the corresponding RAR windows that could be initiated by potential Rel-17 UEs performing PRACH aggregations. The UE may use the same RAR window configuration as the one configured for Rel-16. In this case, the gNB may correspond to the potential Rel-17 UE with the same RAR message as it does for a Rel-16 UE.

The aforementioned operation of the gNB may be argued to be resource-wasteful, because, e.g., a gNB may respond to receiving multiple PRACH signals from a Rel-17 UE sending PRACH with aggregation by sending multiple RAR messages. However, such an event is not likely given that only a Rel-17 UE in a CE situation will perform PRACH transmission with aggregation, due to the expected low SNR of the received PRACH signal. If multiple RAR messages are indeed received by the UE, a UE may then select the one received with the highest RSRP to respond to. This may be particularly helpful when the PRACH signals are transmitted by the UE using different and narrower beams as in the second embodiment described above and illustrated in FIG. 6. This additional benefit of implementing a form of UL beam refinement comes at the cost of sending multiple RAR messages.

When a Rel-17 UE sends a PRACH signal with L-level aggregation, it is required to at least start a RAR response monitoring window after the transmission of the $L^{th}$ PRACH signal. However, a UE may also start a RAR response monitoring window at earlier points in time after transmitting the first PRACH signal. If the UE operates in this way, a UE may receive a RAR response message corresponding to one of the transmitted PRACH signals before sending all L PRACH signals. Assuming that the UE receives a RAR message before sending the $j^{th}$ PRACH signal (where 'before', in this context means that the time between the received RAR response message and the $j^{th}$ signal is more than the time required to process the received message and stop transmitting the PRACH signal), the UE may behave as follows.

In a first behavior, referred to as Behavior-1, the UE may cease the transmission of the $j^{th}$ PRACH signal and all subsequent PRACH signals. This may be a viable option if PRACH signals within the PRACH aggregation are being transmitted by the UE using the same UL beam. Therefore, receiving a RAR message indicates that PRACH transmission was successful and there is no longer a need for repetitions.

In a second behavior, referred to as Behavior-2, the UE may continue the transmission of the jth PRACH signal and all subsequent PRACH signals as if a RAR message is not yet received.

In a third behavior, referred to as Behavior-3, the UE may continue transmission of the $j^{th}$ PRACH signal and all subsequent PRACH signals. To make use of those transmissions, the gNB is required to identify the set of PRACH signals which belongs to the PRACH aggregation. Therefore, in this option, the UE may report to the gNB the IDs of the upcoming PRACH transmissions. This may be useful in two ways, as follows.

In a first variant of the third behavior, referred to as Behavior-3a, if PRACH aggregations were transmitted using different UL-Tx beam in an attempt to identify the best narrow UL beam, then continuing such transmission may serve the purpose of UL beam refinement. The gNB may send a RAR-like message after the last PRACH transmission indicating which preamble was best received. Rel-16 PRACH transmission includes PRACH formats which include sequence repetitions. These repetitions may be used by the gNB to perform a UL-Rx beam refinement procedure. In this case, Behavior-3a may perform both UL-Tx and UL-Rx beam refinement.

In a second variant of the third behavior, referred to as Behavior-3b, the UE may send each PRACH aggregation using the same UL beam. This may give rise to the option that the gNB may perform a UL-Rx beam refinement procedure: the UE may transmit the remaining PRACH signals using the same best UL-Tx beam, and the gNB may use this UL-Tx beam to search for the best UL-Rx narrow beam.

FIGS. 10A-10D show various possibilities for the behavior of a Rel-17 UE with respect to remaining PRACH signals after receiving a RAR message. When providing an identification of the ROs used in PRACH aggregation to the gNB via a particular Msg3, there may be multiple options. One option is that the identification of each RO may be in terms of the absolute time and frequency locations of the RO. Another option is that the identification may be in terms of time and frequency offsets in relation to the RO associated with the transmitted Msg3. For example, an RO indicated in the PRACH aggregation may be in terms of slots (time division multiplexed (TDMed)) ROs before or after the particular RO and (frequency division multiplexed (FDMed)) ROs above and below the particular RO. This approach may be useful in reducing the overhead of indicating absolute time and frequency values of multiple ROs.

Depending on UE behavior, a Rel-17 UE may be required to send the gNB some additional information after receiving a RAR message, e.g., it may be required to transmit to the gNB the IDs of the preambles that were and will be transmitted by the UE during the PRACH aggregation. This information may be included in the corresponding Msg3. For example, (i) the information may be added in the payload of the Msg3, or (ii) the information may be included in the MAC header of the PUSCH corresponding to the Msg3. The latter approach may be useful to aid in the decoding of Msg3 if the MAC header was successfully decoded but the PUSCH payload was not. In this case, the information extracted from the MAC header may allow the gNB to receive repetitions of Msg3 as discussed below, in the context of message combining.

In another mechanism, a Rel-17 UE may select one preamble to use in a first PRACH transmission among the PRACH aggregations, and then the UE is restricted to using the same preamble sequence in all upcoming PRACH repetitions. Using this mechanism, the gNB is able to identify the sequence of PRACH aggregation transmissions once the gNB identifies the preamble sequence used by the Rel-17 UE. This reduces the overhead of conveying the preamble ID information of all PRACH transmissions performed by the Rel-17 UE, since only the RO locations are indicated in the Msg3 payload and MAC header. Namely, a reduction of $L*\log_2 64=6L$ bits may be attained for an L-level PRACH aggregation and assuming 64 preambles per RO.

For each Msg2 (RAR message) scheduled by the gNB, there is a corresponding resource allocation for a PUSCH corresponding to the expected Msg3 (RAR response message) by the UE. A UE with Rel-17 PRACH aggregation is required to respond to at least one Msg2 by sending the corresponding Msg3. Then, the resource allocations for all remaining hypothetical Msg3s remain to be handled.

One option, referred to as resource reservations, may be used, as follows. The resource allocations may be reserved in anticipation of the upcoming Msg3. This is a direct consequence of the gNB behavior which treats all PRACH transmissions as coming from different virtual UEs. This is the simplest behavior although it incurs resource waste. This would be a direct consequence of UE Behavior-1 and Behavior-2.

Another option, referred to as resource release, may be used, as follows. The reservation of such resources may be canceled upon determining that the corresponding PRACH transmissions belong to the same UE. This requires that the gNB acquires such information, and is therefore a valid option for UE Behavior-3. This may be done by letting the Rel-17 UE include in Msg3 all the preamble IDs transmitted by the UE. When the gNB receives this Msg3, it knows which other Msg3 reservations correspond to PRACH aggregations and may thus release their resources.

Another option, referred to as message combining, may be used, as follows. The UE may be allowed to utilize the extra resources to perform Msg3 repetitions or aggregations. This also requires that the gNB is informed that these resource allocations belong to PRACH transmissions within one PRACH aggregation. The same indication mechanism as may be used in resource release may be used here. The Msg3 repetitions may be used by the gNB to enhance the reception of the RAR message response. This option is only valid if the gNB is able to retrieve the information regarding the preamble IDs in the PRACH aggregation of the UE, while still being unable to decode the payload of Msg3; this may be the situation if the UE includes the preamble ID information in the MAC header of Msg2.

Both resource reservations and resource release may require a certain timeline to be feasible. Namely, a Msg2 containing the necessary information must be received sufficiently far in advance of the following Msg3 for the resources to be released or combined. For example, any Msg3 resources occurring after the reception of Msg2 but before enough time has elapsed to process the Msg2 are automatically handled according to the method of resource reservations. Also, any Msg3 transmission informing the gNB of (i) the UE behavior with respect to PRACH aggregated transmissions and of (ii) the associated Msg3 resources must be decoded by the gNB and its information processed by the gNB.

The embodiment of FIG. 9A may involve the following provisions in the specification. First, a Rel-17 UE is allowed to transmit PRACH signals with L-level aggregation (i.e., without employing a RAR response monitoring window after each PRACH transmission) if the UE passes the CE condition corresponding to this particular aggregation level. Second, a Rel-17 UE transmission of PRACH signal with aggregation may be employed with or without a power ramping behavior. Third, upon sending a PRACH signal with aggregation, a Rel-17 UE responds to at most one correspond RAR message. A UE may be configured to reply to the first received RAR message, or a UE may be configured to wait for possible multiple RAR messages. In the latter case, it may select the RAR message to which it responds based on some criteria. An example of such a criterion is the RSRP level of each RAR message. Another example is an indicator added by the gNB in the RAR message which indicates the RSRP level of the received PRACH signal.

In a set of embodiments that may be referred to as Scheme 3, a RACH mechanism for Rel-17 UEs with CE capabilities may be performed alongside Rel-16 UEs in separate resources. Namely, the Rel-17 RACH procedure allows UEs to transmit PRACH signals with aggregation in different resources than the one used for a Rel-16 RACH procedure. The set of separate resources for Rel-17 UEs may consist of separate ROs or separate preambles within the same ROs, or a combination of both. With such a separation of resources, a gNB is able to determine the existence of Rel-17 UEs performing a RACH procedure with PRACH aggregation and handle the transmissions from the UEs accordingly.

In this scheme, a Rel-17 UE follows the legacy RACH procedure by picking a preamble and RO resource corresponding to the SSB index received with the highest RSRP. However, the UE picks such resources in the set of resources configured for a Rel-17 RACH procedure with PRACH aggregation. After transmission, a UE may start a RAR response monitoring window after the last PRACH repetition, after each PRACH repetition, or proceed according to other options. In any configuration, a gNB is aware of the UE behavior in terms of the RAR response monitoring window and acts accordingly.

In this scheme, a Rel-17 UE only sends a PRACH signal with aggregations if the UE is in CE scenario. A UE makes such a decision based on the received RSRP of the best SSB index using one or various thresholds as discussed in Scheme 2.

When a Rel-17 UE sends PRACH signal with L-level aggregation, it is required to at least start a RAR response monitoring window after the transmission of the $L^{th}$ PRACH signal. However, a UE may also start a RAR response monitoring window at earlier points in time after transmitting the 1st PRACH signal. If the UE operates in this way, the gNB may provide the UE with a RAR response message corresponding to one of the transmitted PRACH signals before the UE sends all L PRACH signals. This gives the UE the ability to finish the RACH procedure at an earlier time with reduced latency, but this comes at the expense of higher complexity in monitoring for multiple RAR instances. Upon receiving a RAR message, the UE has the same options (Behavior-1, Behavior-2 and Behavior-3) regarding the transmission of the remaining PRACH signals.

Depending on UE behavior, a Rel-17 UE may be required to send the gNB some additional information after receiving a RAR message, e.g., the IDs of the preambles that were and will be transmitted by the UE during the PRACH aggregation. This information may be included in the corresponding Msg3. For example, (i) the information may be added in the payload of Msg3, or (ii) the information may be included in the MAC header of the PUSCH corresponding to Msg3. The latter may be useful to aid in the decoding of Msg3 if the MAC header was successfully decoded but the PUSCH payload was not. In this case, the information extracted from the MAC header may allow the gNB to receive repetitions of Msg3 as discussed above, in the context of message combining.

Alternatively, a Rel-17 UE may tie the preamble sequences that are used in PRACH aggregated transmission. Specifically, a Rel-17 UE may select one preamble to use in a first PRACH transmission among the PRACH aggregations, and then the UE is restricted to using the same preamble sequence in all upcoming PRACH repetitions. Using this mechanism, the gNB is able to identify the sequence of PRACH aggregation transmissions once the gNB identifies the preamble sequence used by the Rel-17 UE. Because the RO configuration for PRACH aggregated transmission is a separate configuration from Rel-16, there is a natural tying behavior in the ROs being used for PRACH aggregated transmission. Therefore, when preamble sequences are also tied, this allows the gNB to uniquely determine the sequence of PRACH preambles and ROs in a PRACH aggregation by detecting the first preamble sequence and without any additional information from the UE.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The terms "processing circuit" and "means for processing" are used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB. A UE may include a radio and a processing circuit for performing the methods described herein, e.g., the processing circuit may receive and transmit signal (via the radio) and perform other processing tasks to process the received signals or to generate signals to be transmitted.

As used herein, the term "array" refers to an ordered set of numbers regardless of how stored (e.g., whether stored in consecutive memory locations, or in a linked list). As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for PUSCH and PRACH enhancements have been specifically described and illustrated herein, many modifications and variations will be apparent to those skilled in the art. Accordingly, it is to be understood that a system and method for PUSCH and PRACH enhancements constructed according to principles of this disclosure may be embodied other than as specifically described herein. The invention is also defined in the following claims, and equivalents thereof.

What is claimed is:

1. A method, comprising:
    transmitting, by a User Equipment (UE), in a first slot, a first Physical Uplink Shared Channel (PUSCH) transmission comprising a first set of coded bits selected based on a first redundancy version (RV), the first set of coded bits encoding first data;
    determining, by the UE, that a second slot is available for a repetition of the first PUSCH transmission;
    determining, by the UE, a second redundancy version based on the first redundancy version and based on a number of actual PUSCH transmissions corresponding to the first PUSCH transmission, the second redundancy version being different from the first redundancy version; and
    transmitting, by the UE, in the second slot, the repetition of the first PUSCH transmission as a second PUSCH transmission based on the second redundancy version, such that the second PUSCH transmission comprises a second set of coded bits encoding all of the first data, the first slot and the second slot being separated by at least one downlink slot.

2. The method of claim 1, wherein the second set of coded bits is selected based on the second redundancy version.

3. The method of claim 1, wherein the number of PUSCH transmissions corresponding to the first PUSCH transmission is k, k being an integer greater than zero.

4. The method of claim 1, wherein:
    the repetition of the first PUSCH transmission is an earliest repetition; and
    the second slot is later than the slot immediately following the first slot.

5. The method of claim 1, wherein the second PUSCH transmission is a Type A repetition of the first PUSCH transmission.

6. The method of claim 1, wherein the determining that the second slot is available for a repetition of the first PUSCH transmission comprises:
    receiving a slot format indicator (SFI); and determining that the second slot is a slot identified, by the SFI, as an uplink slot.

7. The method of claim 1, wherein the determining that the second slot is available for a repetition of the first PUSCH transmission comprises:
missing a slot format indicator (SFI) having a region of applicability having a beginning and an end and comprising a plurality of slots; and
determining that the second slot occurs later than the end of the region of applicability.

8. The method of claim 1, further comprising:
determining that no slots are available after a last scheduled PUSCH repetition and before an end of a maximum PUSCH transmission duration interval, and
not transmitting a PUSCH repetition after the last scheduled PUSCH repetition.

9. The method of claim 1, further comprising:
receiving an indication from a network node (gNB) that a third slot is available for a PUSCH repetition;
receiving an indication from the gNB that the third slot is not available for a PUSCH repetition; and
determining that the third slot is not available for a PUSCH repetition.

10. The method of claim 1, wherein:
the transmitting, by the UE, of the first PUSCH transmission comprises transmitting the first PUSCH transmission as a non-codebook based transmission using a first precoding matrix; and
the transmitting, by the UE, of the second PUSCH transmission comprises transmitting the second PUSCH transmission as a non-codebook based transmission using a second precoding matrix, different from the first precoding matrix.

11. The method of claim 10, further comprising:
indicating, by the UE, using a first non-codebook based Sounding Reference Signal (SRS) instance, the first precoding matrix; and
indicating, by the UE, using a second non-codebook based Sounding Reference Signal instance, the second precoding matrix.

12. The method of claim 1, further comprising:
sending a Physical Random Access Channel (PRACH) preamble in a first Random Access Channel (RACH) Occasion (RO); and
sending the PRACH preamble in a second RO.

13. The method of claim 12, wherein the UE does not initiate a Random Access Response (RAR) monitoring window after sending the PRACH preamble in the first RO and before sending the PRACH preamble in the second RO.

14. A User Equipment (UE), comprising:
a processing circuit; and
a radio,
the processing circuit being configured to:
transmit, in a first slot, a first Physical Uplink Shared Channel (PUSCH) transmission comprising a first set of coded bits selected based on a first redundancy version (RV), the first set of coded bits encoding first data;
determine that a second slot is available for a repetition of the first PUSCH transmission;
determine, a second redundancy version based on the first redundancy version and based on a number of actual PUSCH transmissions corresponding to the first PUSCH transmission, the second redundancy version being different from the first redundancy version; and
transmit, in the second slot, the repetition of the first PUSCH transmission as a second PUSCH transmission based on the second redundancy version, such that the second PUSCH transmission comprises a second set of coded bits encoding all of the first data, the first slot and the second slot being separated by at least one downlink slot.

15. The UE of claim 14, wherein the second PUSCH transmission is a Type A repetition of the first PUSCH transmission.

16. The UE of claim 14, wherein the determining that the second slot is available for a repetition of the first PUSCH transmission comprises:
receiving a slot format indicator (SFI); and
determining that the second slot is a slot identified, by the SFI, as an uplink slot.

17. The UE of claim 14, wherein the determining that the second slot is available for a repetition of the first PUSCH transmission comprises:
missing a slot format indicator (SFI) having a region of applicability having a beginning and an end and comprising a plurality of slots; and
determining that the second slot occurs later than the end of the region of applicability.

18. The UE of claim 14, wherein the processing circuit is further configured to:
determine that no slots are available after a last scheduled PUSCH repetition and before an end of a maximum PUSCH transmission duration interval, and
not transmit a PUSCH repetition after the last scheduled PUSCH repetition.

19. The UE of claim 14, wherein the processing circuit is further configured to:
receive an indication from a network node (gNB) that a third slot is available for a PUSCH repetition;
receive an indication from the gNB that the third slot is not available for a PUSCH repetition; and
determine that the third slot is not available for a PUSCH repetition.

20. A User Equipment (UE), comprising:
means for processing; and
a radio,
the means for processing being configured to:
transmit, in a first slot, a first Physical Uplink Shared Channel (PUSCH) transmission comprising a first set of coded bits selected based on a first redundancy version (RV), the first set of coded bits encoding first data;
determine that a second slot is available for a repetition of the first PUSCH transmission;
determine, a second redundancy version based on the first redundancy version and based on a number of actual PUSCH transmissions corresponding to the first PUSCH transmission, the second redundancy version being different from the first redundancy version; and
transmit, in the second slot, the repetition of the first PUSCH transmission as a second PUSCH transmission based on the second redundancy version, such that the second PUSCH transmission comprises a second set of coded bits encoding all of the first data, the first slot and the second slot being separated by at least one downlink slot.

* * * * *